US007964268B2

(12) United States Patent
Waters et al.

(10) Patent No.: US 7,964,268 B2
(45) Date of Patent: Jun. 21, 2011

(54) INSULATING STRUCTURES

(75) Inventors: Ronald Waters, Cardiff (GB); Abderrahmane Haddad, Cardiff (GB)

(73) Assignee: University College Cardiff Consultants Limited, Cardiff (GB)

( * ) Notice: Subject to any disclaimer, the term of this patent is extended or adjusted under 35 U.S.C. 154(b) by 671 days.

(21) Appl. No.: 10/572,180

(22) PCT Filed: Sep. 20, 2004

(86) PCT No.: PCT/GB2004/003988

§ 371 (c)(1),
(2), (4) Date: Dec. 4, 2006

(87) PCT Pub. No.: WO2005/027149

PCT Pub. Date: Mar. 24, 2005

(65) Prior Publication Data

US 2007/0102783 A1 May 10, 2007

(30) Foreign Application Priority Data

Sep. 18, 2003 (GB) .................................. 0321817.9

(51) Int. Cl.

| | |
|---|---|
| ***B32B 3/00*** | (2006.01) |
| ***B32B 1/00*** | (2006.01) |
| ***H01B 17/00*** | (2006.01) |
| ***H01B 17/38*** | (2006.01) |
| ***H01B 17/20*** | (2006.01) |
| ***H01B 17/32*** | (2006.01) |
| ***H01B 17/60*** | (2006.01) |

(52) U.S. Cl. ........ 428/174; 428/156; 174/212; 174/195; 174/178; 174/209; 174/137 R

(58) Field of Classification Search .................. 428/156, 428/167, 174; 174/212, 178, 209, 137 R, 174/195

See application file for complete search history.

(56) References Cited

U.S. PATENT DOCUMENTS

| | | | | |
|---|---|---|---|---|
| 2,056,813 | A | 10/1936 | Vrooman | |
| 5,830,405 | A | 11/1998 | Mazeika et al. | |
| 2002/0100605 | A1 * | 8/2002 | Ramarge et al. .......... | 174/137 A |

FOREIGN PATENT DOCUMENTS

| | | | |
|---|---|---|---|
| DE | 101 12 689 | A1 | 3/2001 |
| DE | 10112689 | A1 * | 4/2002 |
| GB | 436397 | | 10/1935 |
| GB | 1021081 | | 2/1966 |
| GB | 1135189 | | 11/1968 |
| GB | 1148977 | | 4/1969 |
| WO | WO 97/32317 | | 9/1997 |
| WO | WO 02/061767 | A1 | 8/2002 |
| WO | WO 2005/022560 | A1 | 3/2005 |

* cited by examiner

*Primary Examiner* — David R Sample
*Assistant Examiner* — Catherine Simone
(74) *Attorney, Agent, or Firm* — Gordon & Jacobson, PC

(57) ABSTRACT

An electrical insulator comprises an elongate shank and one or more sheds disposed along the length of the shank. The surface of the insulator comprises longitudinally extending flutes, the depth of which are varied along the length of the insulator such that the circumferential distance of all transverse sections along the length of the insulator is substantially constant or controlled. Instead of flutes, the surface may be formed with an array of protuberances and/or concavities. The insulator thus provides a defined perimeter and surface area along its length, such that areas of the surface are not preferentially heated by surface currents to form dry bands and thereby cause arcing. Such topography also renders the insulator less susceptible to the degrading effects of surface pollution.

5 Claims, 5 Drawing Sheets where: S = total circumferential length
θ = angular distance around insulator from given starting point
r = radius of insulator at any point (based on existing insulator design)
h = amplitude of flute at given radius
and the number of flutes is designated "N"

INSULATING STRUCTURES

BACKGROUND OF THE INVENTION

1. Field of the Invention

This invention relates to insulating structures and, in particular, to insulating structures for use in electrical systems in atmospheric, gas-insulated or liquid dielectric environments, such as insulators, bushings, spacers and dielectric housings for high voltage devices.

2. State of the Art

In general, the integrity of insulating structures that are exposed to surface pollution or moisture may be prejudiced by electrical discharges across non-conducting bands that can lead to damage and/or flashover.

Insulating structures for outdoor and industrial applications generally consist of axi-symmetric shapes that usually include umbrella-type sheds in their design. These sheds are designed to increase the longitudinal surface (creepage) length in order to achieve a given withstand voltage level and to mitigate the effects of precipitation.

The substantial size of insulators, bushings and dielectric housings for high-voltage devices which are used in ambient environments, whether indoor or outdoor but especially in industrial or coastal sites, arises mainly from the large values of surface creepage length (mm/kilovolt) which are needed for safe insulation performance when they are polluted. Although a dry layer of pollution (whether industrial pollutants or saline deposits) normally has little effect upon the dielectric strength of the insulating structure, problems arise when the pollution layer becomes wet under fog or light rain. The conductivity of the wetted surface of the structure leads to a leakage current which, although itself generally not harmful, can often cause partial drying which encircles the surface (dry bands). A large proportion of the voltage applied to the insulator will appear across the band with consequential damage from electrical breakdown (partial arcs or complete flashover).

The importance of good pollution performance of insulating structures is of such significance that international standards specify high-voltage laboratory test procedures (salt-fog and clean-fog tests) to achieve agreed specifications.

In the past, low, medium and high voltage insulators have been made generally of porcelain or glass. Such materials are highly insulating in relatively dry environments. However, the surface resistance of such materials tends to decrease by around four or five orders of magnitude in polluted, wet or humid conditions, thereby substantially reducing their insulating properties. Further, the heavy, brittle nature of such materials makes them vulnerable to accidental damage and vandalism, and, in addition, collection of pollutants on the porcelain or glass outer surface can result in flashover or arcing as well as unacceptably high leakage current from one end of an insulator terminal to the other.

In order to limit discharges across dry bands, particularly for use in severe environments, some types of insulating structure have a semiconducting glaze applied thereto. However, although this solution provides some improvement, it does not successfully eliminate partial arcs.

Polymeric materials, such as ethylene propylene diene monomer (EPDM) and silicone rubber are finding increased application in the manufacture of insulators and other high voltage equipment. Compared with long-established porcelain and glass structures, they have (with glass-fibre reinforcement) a superior strength-to-weight ratio, are less environmentally obtrusive, and are less vulnerable to accidental damage or vandalism.

More importantly, such materials can contribute to improved equipment design due to their good dielectric performance, particularly under polluted conditions. This is due to the natural hydrophobicity of polymeric materials which prevents the occurrence of a continuous wet surface, thereby inhibiting leakage currents and the formation of dry-band arcing. It is well established that the hydrophobic property of a clean polymeric surface is transmitted to an overlying layer of pollution, probably as a result of diffusion of oily constituents through the layer.

U.S. Pat. No. 5,830,405 describes a tubular polymeric shed comprising a central tubular portion surrounding an elongated core. A plurality of radial wall ring fin extensions extend from the central tubular portion and a skirt line extension (or "shed") to increase creepage length and reduce partial arcs. However, this solution does not successfully eliminate partial arcs.

FIGS. 1 and 2 of the drawings represent a portion of a conventional insulating structure 100 showing a single shed 102 and part of the insulating shank 104. When the structure is carrying a longitudinal surface current I under adverse conditions, the current density J (in amperes/$m^2$) is non-uniform even where the pollution layer is of uniform conductivity σ (Siemens/m) and thickness T. This is because the radius r and therefore the circumference S of the circular surface contours varies along the sheds of the structure.

In this case, the current density in the pollution layer is given by:

$$J=I/(ST)=I/(2\pi rT)$$

For this uniform pollution condition, the surface electric field E (in volts/m) is also longitudinal and non-uniform, and is given by:

$$E=I/(\sigma ST)=J/\sigma$$

Heating of the moist pollution layer is non-uniform, thereby causing dry bands to form. The power density dissipation P (watts/$m^3$) of such surface layer heating is given by:

$$P=EJ=J^2/\sigma=I^2/(\sigma S^2T^2)$$

This equation indicates that the greatest heating of a uniform pollution layer will occur on the insulating structure in the region of the smallest contour perimeter S(min). Dry bands will thus most easily form at the shank 104 of the structure. As a result, in the case of conventional polymeric insulators, bushings and housings which employ such non-uniform profiles, it has been found that such polymeric structures frequently fail because of damage in the shank region where partial-arc activity is greatest.

Further, research is continuing concerning the long-term durability of polymeric materials. Ageing and degradation occur which can adversely affect the surface condition of the materials and cause loss of hydrophobicity, and the occurrence of dry-band partial arcing could more easily result in tracking or surface erosion than is the case for the traditional inorganic structures, which is clearly unacceptable.

SUMMARY OF THE INVENTION

We have now devised an arrangement which overcomes some of the problems outlined above. Thus, in accordance with the present invention, there is provided an insulating structure, at least a portion of the insulating surface of which has a patterned texture.

For a two-dimensional patterned texture, the insulating structure surface is preferably fluted and preferably comprises a generally elongated structure which is preferably longitudinally fluted. The width, radius or circumference of the insulating structure is preferably non-uniform along its length, with the flute depth at any point on said structure varying according to its width, radius or circumference at that point, so that the perimeter length for all transverse sections of the insulating structure is substantially constant along its length. Alternatively, a controlled variation of perimeter length may be chosen.

The flute profile may be any suitable shape, including sinusoidal or straight-edged saw-tooth for example.

For a three-dimensional patterned texture, the insulating structure surface is preferably formed with protuberances and/or concavities and preferably comprises a generally elongated structure which preferably has a surface with an array of protuberances or concavities: these are preferably geometrical sections of spherical, ellipsoidal, paraboloidal, hyperboloidal, conical or other symmetrical form. The form of the protuberances or concavities may be such that the surface area per unit axial length of the insulating structure is substantially constant along its length. Alternatively, a controlled variation of surface area may be chosen.

BRIEF DESCRIPTION OF THE DRAWINGS

Embodiments of the invention will now be described by way of examples only and with reference to the accompanying drawings, in which.

DETAILED DESCRIPTION OF THE PREFERRED EMBODIMENTS

Figure 1:
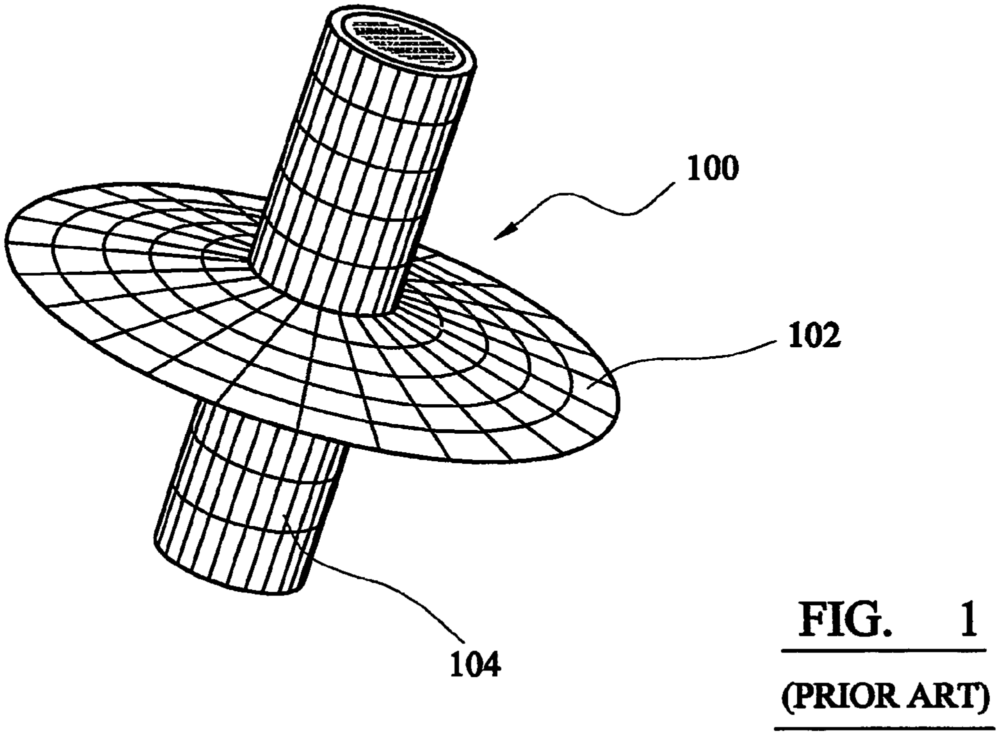
FIG. 1 (PRIOR ART)
FIG. 1 is a schematic (partially sectional) view of a portion of a prior art insulator.
Figure 2:
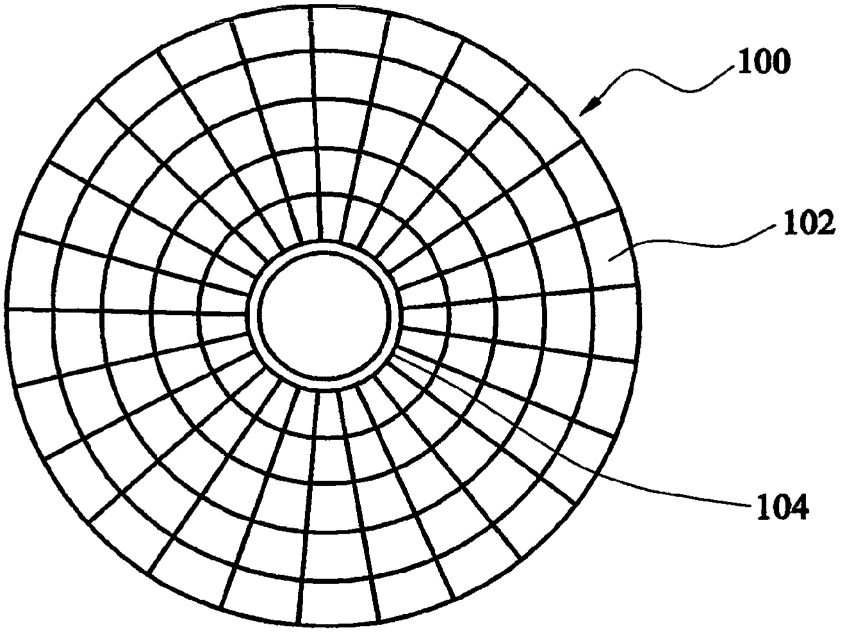
FIG. 2 (PRIOR ART)
FIG. 2 is a plan view of a prior art insulator of FIG. 1.
Figure 3:
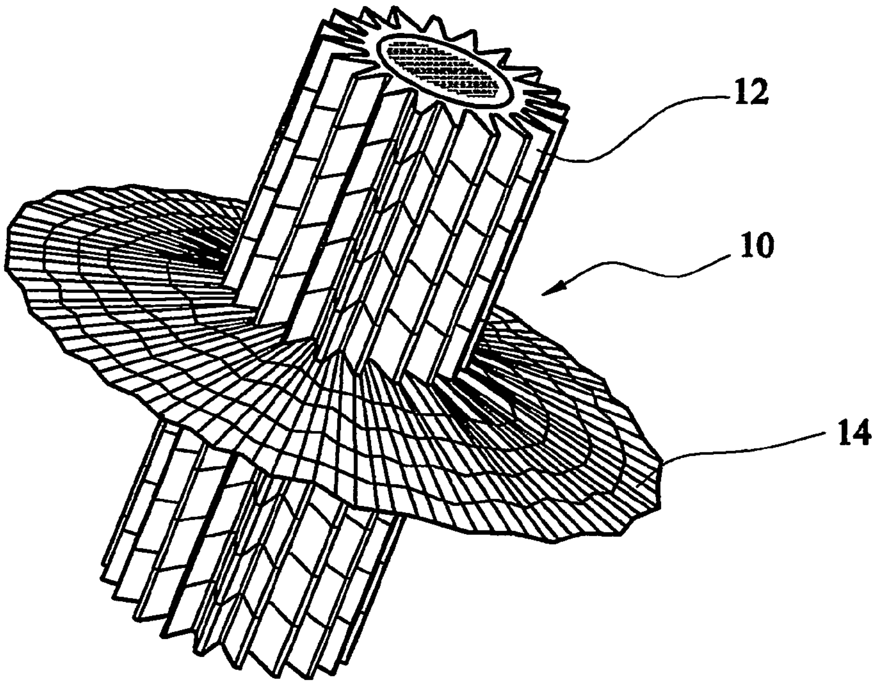
FIG. 3 is a schematic (partially sectional) view of a portion of an insulator according to a first embodiment of the present invention.
Figure 4:
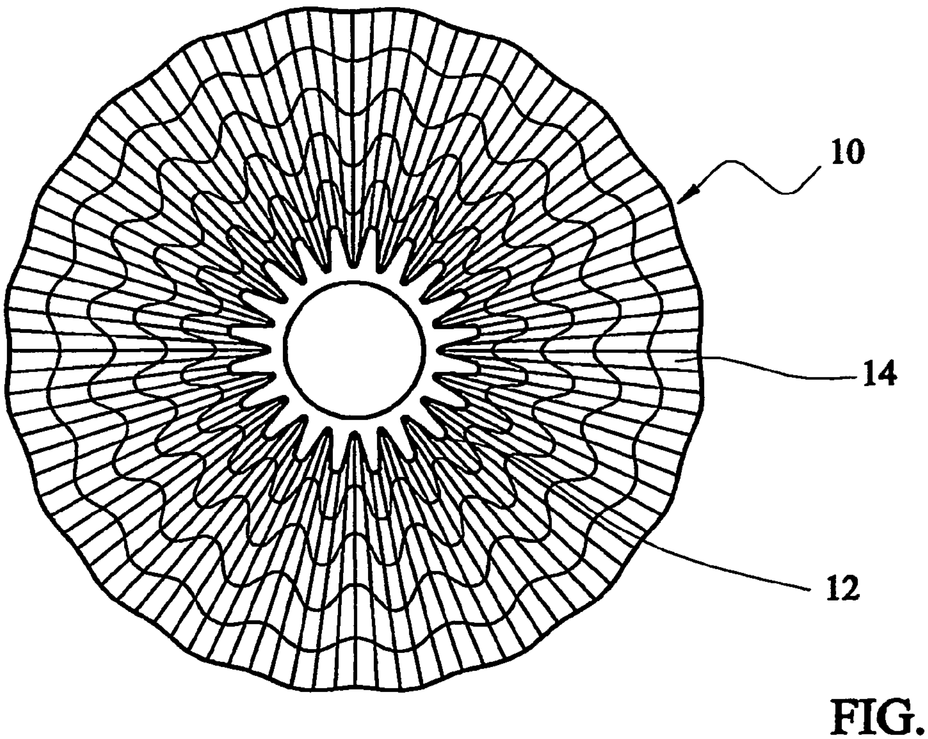
FIG. 4 is a plan view of the insulator of FIG. 3.
Figure 5:
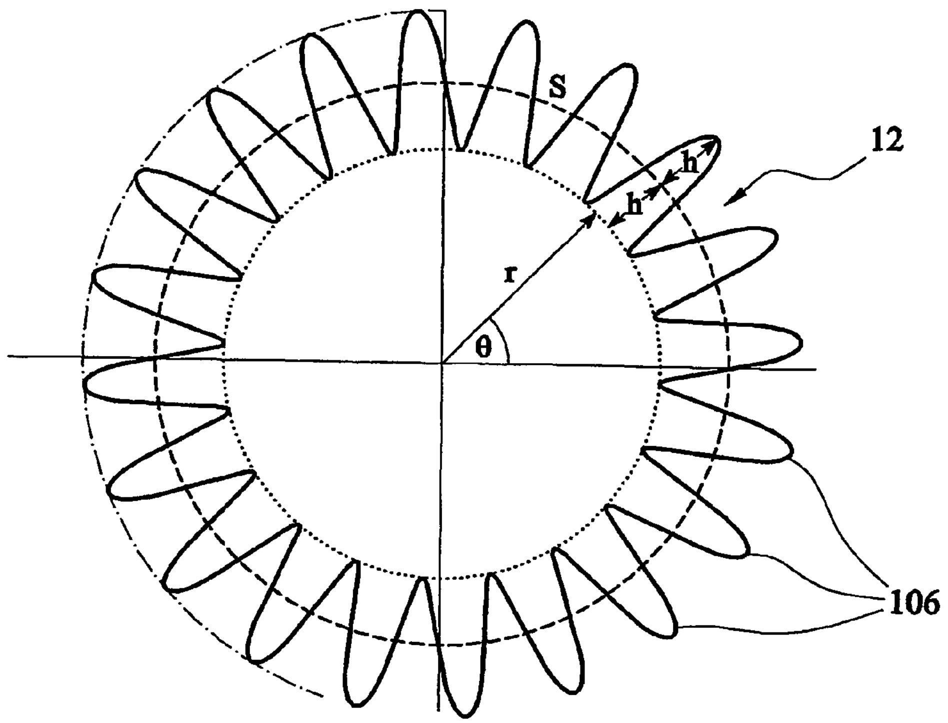
FIG. 5 is a schematic cross-sectional representation of a shank for use in the insulator shown in FIGS. 3 and 4.

Referring to FIGS. 3 and 4 of the drawings, an insulating structure 10 according to a first embodiment of the present invention comprises a shank 12 and one or more sheds 14. The insulating surface of both the shank 12 and the shed(s) 14 is longitudinally fluted, as shown. The design of the flute profiles can incorporate any number of basic shapes. One suitable shape is sinusoidal, as shown in FIG. 5, which in some cases may be considered to be advantageous over, for example, straight-sided saw-tooth flutes, the sharp edges of which may give rise to large-value radial electric fields and possible electric discharge activity. However, many different shapes of flute profile are envisaged, including saw-tooth, and this description is not intended to be limiting in this respect.

The longitudinal fluting of the insulating surface, suitably dimensioned (to achieve a substantially constant perimeter length for all transverse sections along the structure), results in a substantially constant-perimeter surface contour which provides a substantially constant leakage current density and a substantially constant electric field for a uniform-conductivity pollution layer at all points on the surface of the insulating structure, including the shed(s). Since the magnitudes of I, σ and T vary with ambient conditions, optimum control of P can be achieved by maintaining a substantially constant value of the contour perimeter S. Thus, the rate of surface-layer heating is maintained as nearly constant as possible, thereby preventing, or at least retarding, dry-band formation, without adversely affecting creepage length.

Figure 6:
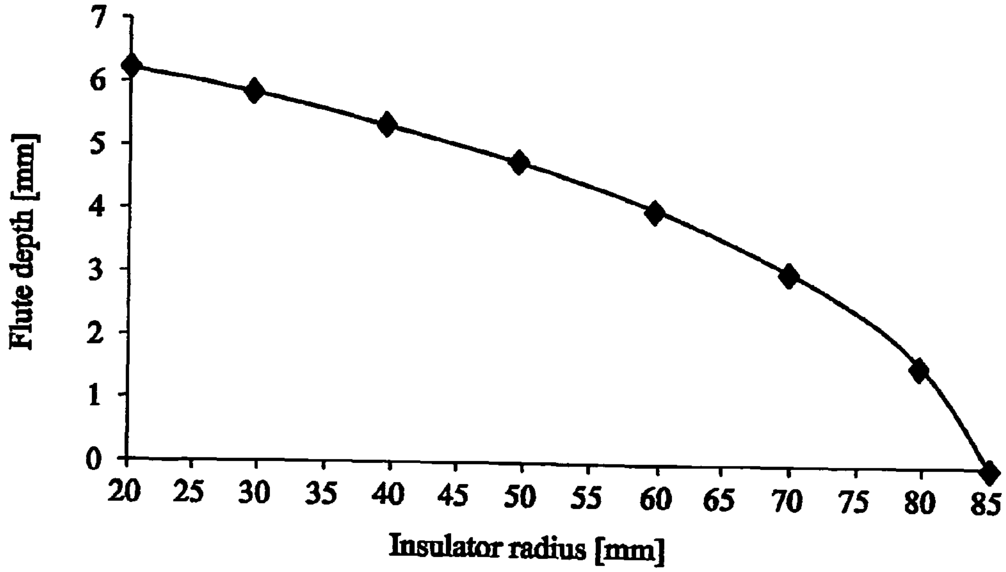
FIG. 6 is a graph representing the variation of flute depth with insulator radius, in the insulator of FIGS. 3 to 5.

The optimum design requirement in the sinusoidal flute shape shown in FIG. 5 is to choose the values of flute amplitude h which will maintain a constant perimeter length S for all values of radius r along the length of the insulating structure. In this case the variation of h with r can be computed by evaluation of appropriate elliptic integrals of the second kind. FIG. 6 shows how the flute depth would be designed to vary for an insulating shank/shed structure, for an example where the outer radius of the shed is 85 mm and the inner radius of the shank is 20 mm. The outer radius will determine the perimeter length to be equal to the circumference S=2π85 mm=534 mm. The number N of the flutes is chosen in order to define a suitable maximum flute depth H. In general, the larger the radius r, the smaller the flute amplitude h(max).

Figure 7:
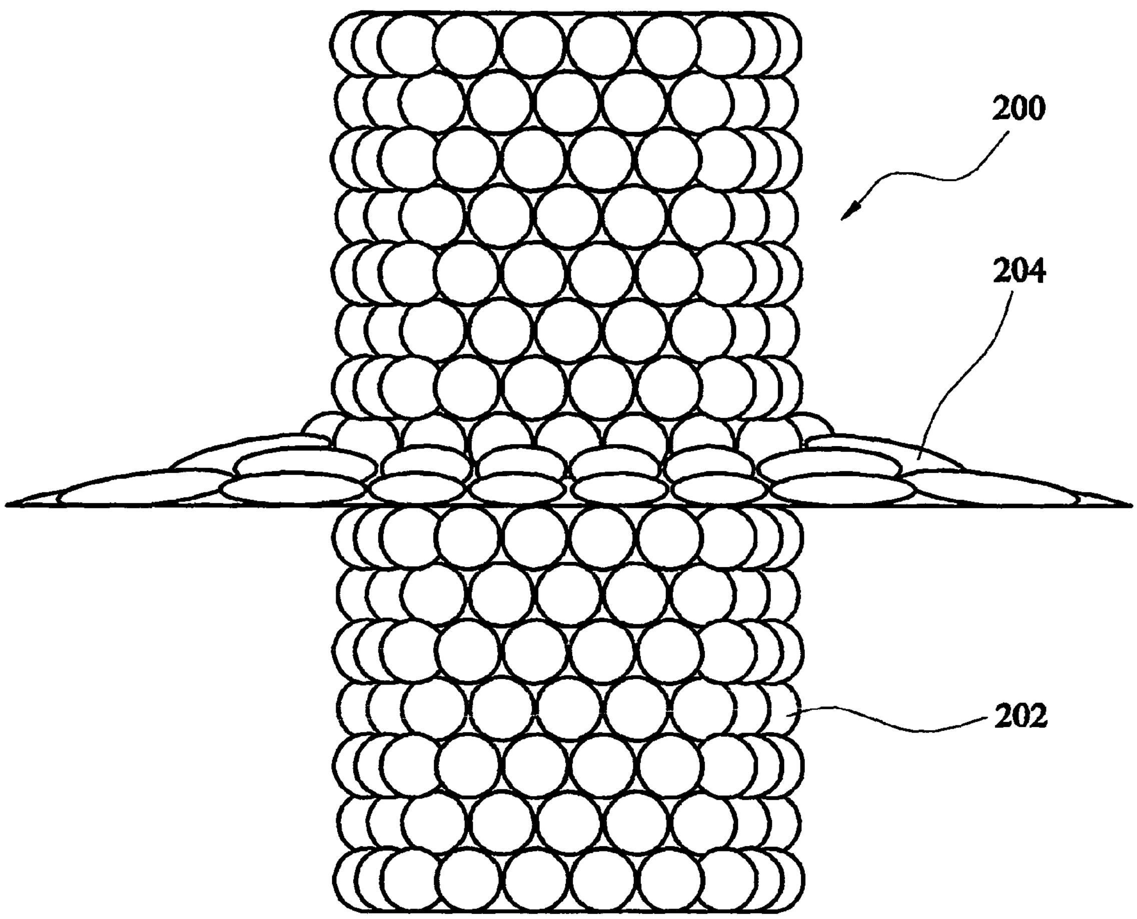
FIG. 7 is a side view of an insulator according to a second embodiment of the present invention.
Figure 8:
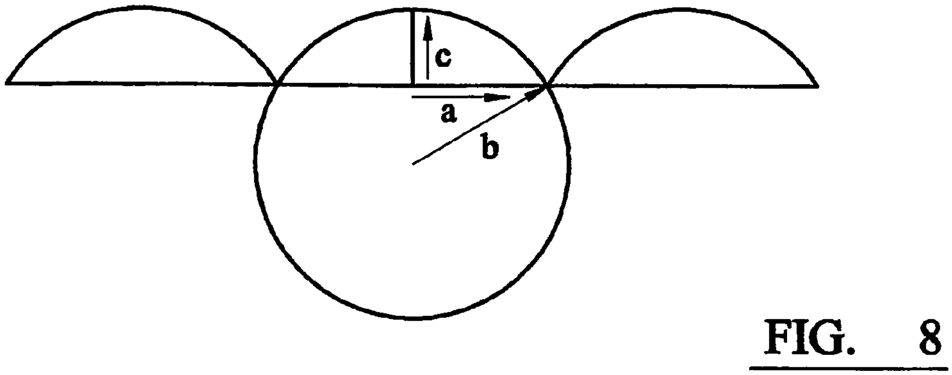
FIG. 8 is a sectional view through surface protuberances of spherical geometry of the insulator of FIG. 7.

Referring to FIG. 7 of the drawings, an insulating structure 200 according to a second embodiment of the present invention comprises a shank 202 and one or more sheds 204. The insulating surface of both the shank 202 and shed 204 are formed with an array of protuberances or concavities, as shown. The protuberances or concavities can be of any number of basic shapes. One suitable shape is part-spherical, as shown in FIG. 8, which represents a protuberance of height c formed by a part of a sphere of radius b, which results in a protuberance having a radius a, in plan view.

In this case $$a^2=c(2b-c)$$

and the surface area of the protuberance is $$A(p)=2\pi bc$$

Figure 9:
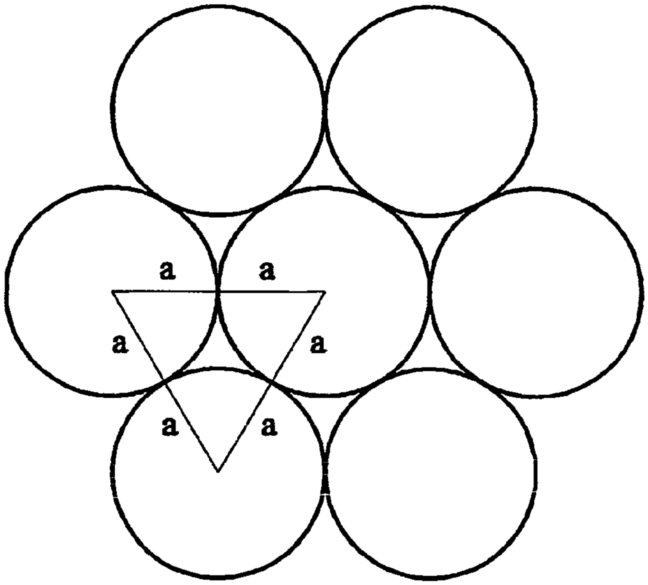
FIG. 9 is plan view of surface protuberances of the insulator of FIG. 7.

If FIG. 9 now represents three adjacent protuberances of this form, then the presence of the protuberances will increase the surface area of the underlying triangular plane surface of side 2*a*, which has a surface area $$A(t)=\sqrt{3}a^2$$

to a value of $$A(p,t)=A(p)/2+A(t)-\pi a^2/2=a2[\pi r/(2b-c)+\sqrt{3}-\pi/2]$$

The surface area is thus increased by the presence of the spherical protuberances by a factor that is defined by the ratio $$A(p,t)/A(t)=1+\pi c/[2\sqrt{3}(2b-c)]$$

The surface area can thus be increased by these part-spherical protuberances by a factor in the range 1 to 1.907, corresponding to a choice of the ratio of protuberance height c to spherical radius r in the range 0<c/r<1, where a hemispherical protuberance will have a value c/r of unity. x. In this case, the limiting value of the area ratio $$[A(p,t)/A(t)]\{\text{hemisphere}\}=1+\pi/2\sqrt{3}$$

is notably independent of the radius b of the protuberance, and is close to the limiting value of 2 given by the ratio of the hemispherical and circular areas. This limiting value can be approached more closely by additional interstitial hemispherical protuberances of radii $$d=b[2\sqrt{3}-1]$$

which will increase the area radio to 1.97. The number of protuberances is chosen in order to define a suitable range of radii b.

Figure 10:
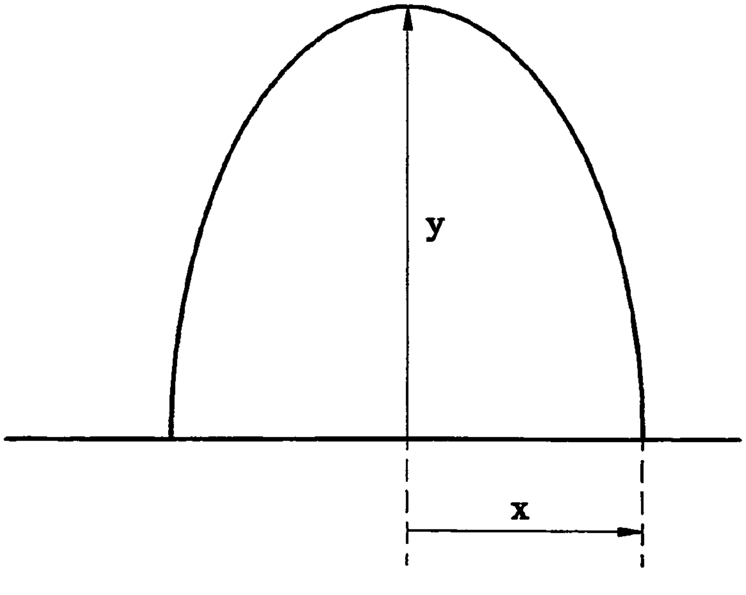
FIG. 10 is a sectional view through surface protuberances of semi-ellipsoidal geometry of the insulator of FIG. 7.

Higher factors can be achieved by other geometrical forms of the protuberance. For the case of a semi-ellipsoidal protuberance, as shown in FIG. 10, whose major axis y is perpendicular to the surface of the insulating structure and whose minor axis x lies on the surface, the surface area of the protuberance is $$[A(p)\{\text{semi-ellipsoid}\}=\pi[x^2+(xy/e)(\sin^{-1}e)]$$

where the eccentricity of the ellipsoid is $$e=\sqrt{(1-x^2/y^2)}$$

For example, a semi-ellipsoidal protuberance with y=2x as a surface area $3.42\pi x^2$, which gives an increased value of the surface area factor of 3.42 compared with the value of 2 or a hemispherical protuberance. In this case, the number of the protuberances is chosen in order to define a suitable range of radii x and eccentricities e.

The three-dimensional patterned texture with protuberances and/or concavities of the insulating surface, suitably dimensioned to achieve a constant or controlled variation of surface area along the structure, will provide a substantially constant or controlled variation of leakage current density and surface electric field for a uniform conductivity pollution layer at all points of the insulating structure. It will also have the important advantage of increasing the longitudinal surface (creepage) length of the insulating structure without increasing the overall length of the structure.

The present invention can be applied to all insulating materials, but is particularly suitable for manufacture with polymeric materials, where moulding, extrusion and machining techniques are available. It is also fully compatible with present designs of standard, anti-fog or helical designs of insulators, bushings and housings. For insulating structures with semiconducting glaze or surface treatment, two-dimensional or three-dimensional patterned texture can be employed, to provide a controlled electric field distribution.

Insulating structures with a partially patterned texture are also envisaged, with the aid of protecting specific areas (for example the shank) of an insulating structure, or to simplify the construction of the insulating structure.

Although it is observed that sea and inland pollution generally leads to a uniform contamination layer, in general, the conductivity of surface pollution will be non-uniform, because of variations in its nature and state of wetting. However, even in the case of non-uniformity, the increased surface perimeter in insulating structures according to the present invention will substantially inhibit the establishment of complete dry bands, since re-wetting of dried-pollution areas will be promoted by the larger surface areas involved. In this way, the bridging of incipient dry bands will at least suppress partial-arc activity.

The use of suitable patterned-textures will also increase the value of the surface creepage length of the insulating structure, because of the increased longitudinal surface path lengths. This increase will be beneficial in allowing the reduction of the size of the insulating structure or in improving the performance of the insulating structure in service.

If the patterned texture is designed to have dimensions that are sufficiently small, then the surface can possess water repellent properties arising from surface tension effects. This will assist the resistance to surface wetting associated with the natural hydrophobicity of polymeric materials.

Exemplary embodiments of the present invention have been described above with reference to the accompanying drawings. However, it will be apparent to persons skilled in the art that modifications and variations of the described embodiments can be made without departing from the scope of the invention.

The invention claimed is:

1. An insulating structure comprising:

an elongate shank extending in a longitudinal direction; and at least one shed extending transverse to the longitudinal direction of the elongate shank;

wherein at least a portion of said shank being formed with an array of substructures selected from protuberances and concavities, wherein said shank has a circumference and said array of substructures are spaced around the circumference of said shank and longitudinally along said shank.

2. An insulating structure as claimed in claim 1, wherein:

said array of substructures have at least one of a spherical, ellipsoidal, paraboloidal, hyperboloidal, conical and symmetric shape.

3. An insulating structure as claimed in claim 1, wherein:

said array of substructures define a first outer surface of said shank, wherein the surface area of said first outer surface is substantially constant per unit length along the longitudinal direction of said shank.

4. An insulating structure as claimed in claim 1, wherein:

said array of substructures define a first outer surface of said shank, wherein the surface area of said first outer surface has a defined variation per unit length along the longitudinal direction of said shank.

5. An insulating structure as claimed in claim 1, wherein:

at least a portion of said shed is formed within an array of substructures selected from protuberances and concavities.

* * * * *